United States Patent
Sandford et al.

(10) Patent No.: US 7,992,723 B2
(45) Date of Patent: Aug. 9, 2011

(54) FILTER CARTRIDGE WITH INLET FLOW DIFFUSER

(75) Inventors: Michael S. Sandford, Oxnard, CA (US); Kanwar Suri, Northridge, CA (US); Michael L. Gao, Oxnard, CA (US); Rowland Ellis, Ventura, CA (US)

(73) Assignee: PTI Technologies, Inc., Oxnard, CA (US)

( * ) Notice: Subject to any disclaimer, the term of this patent is extended or adjusted under 35 U.S.C. 154(b) by 728 days.

(21) Appl. No.: 11/924,261

(22) Filed: Oct. 25, 2007

(65) Prior Publication Data

US 2008/0099401 A1 May 1, 2008

Related U.S. Application Data

(60) Provisional application No. 60/863,101, filed on Oct. 26, 2006.

(51) Int. Cl.
*B01D 35/00* (2006.01)
*B01D 25/30* (2006.01)
*B01D 29/88* (2006.01)
*B01D 35/28* (2006.01)
*B01D 27/00* (2006.01)
*B01D 29/00* (2006.01)

(52) U.S. Cl. .................. 210/456; 210/767; 210/167.01; 210/256; 210/306; 210/314; 210/315; 210/335; 210/337; 210/338; 210/342

(58) Field of Classification Search .................... 210/456
See application file for complete search history.

(56) References Cited

U.S. PATENT DOCUMENTS

| 2,381,141 | A | * | 8/1945 | Russell | ........................ 210/440 |
| 2,427,733 | A | * | 9/1947 | McCann | ....................... 210/489 |
| 3,397,793 | A | * | 8/1968 | MacDonnell | ................ 210/457 |
| 3,724,670 | A | * | 4/1973 | Gernhardt | ..................... 210/448 |
| 4,064,938 | A | * | 12/1977 | Fast | ............................... 166/236 |
| 4,456,529 | A | * | 6/1984 | Shinaver | ....................... 210/306 |
| 5,881,809 | A | | 3/1999 | Gillespie et al. | |
| 5,980,745 | A | | 11/1999 | Voll et al. | |
| 2003/0222010 | A1 | * | 12/2003 | Bassett et al. | ................. 210/312 |

FOREIGN PATENT DOCUMENTS

| DE | 202 13 512 U1 | 2/2004 |
| EP | 1 015 092 | 3/1999 |
| WO | 99/12630 | 3/1999 |
| WO | 2005/044420 A1 | 5/2005 |

OTHER PUBLICATIONS

Brochure entitled, "PTI Technologies, Inc. 421® The Ideal Filter Medium" (4 pages) (2002).

* cited by examiner

*Primary Examiner* — Benjamin Kurtz
(74) *Attorney, Agent, or Firm* — Brinks Hofer Gilson & Lione; Steven P. Shurtz

(57) ABSTRACT

A filter includes filter media and a housing surrounding the media. The housing has an outlet and is sealed such that all fluid flow out of the outlet must first enter the cartridge and pass through the media. The housing has multiple inlet flow paths configured so that fluid impinging on the housing is diffused as it enters the cartridge and is prevented from flowing directly towards the filter media.

25 Claims, 5 Drawing Sheets

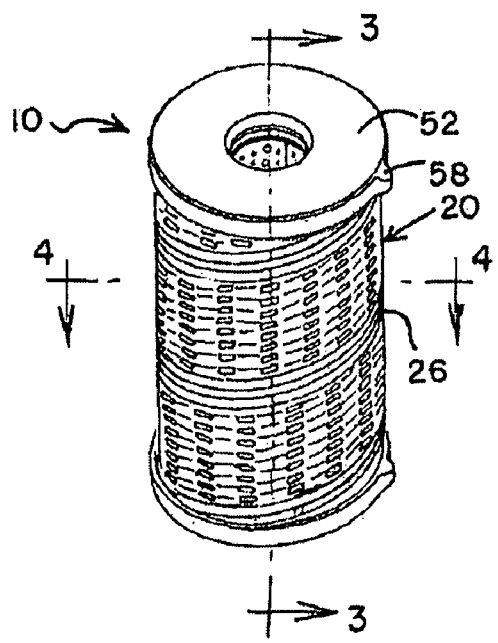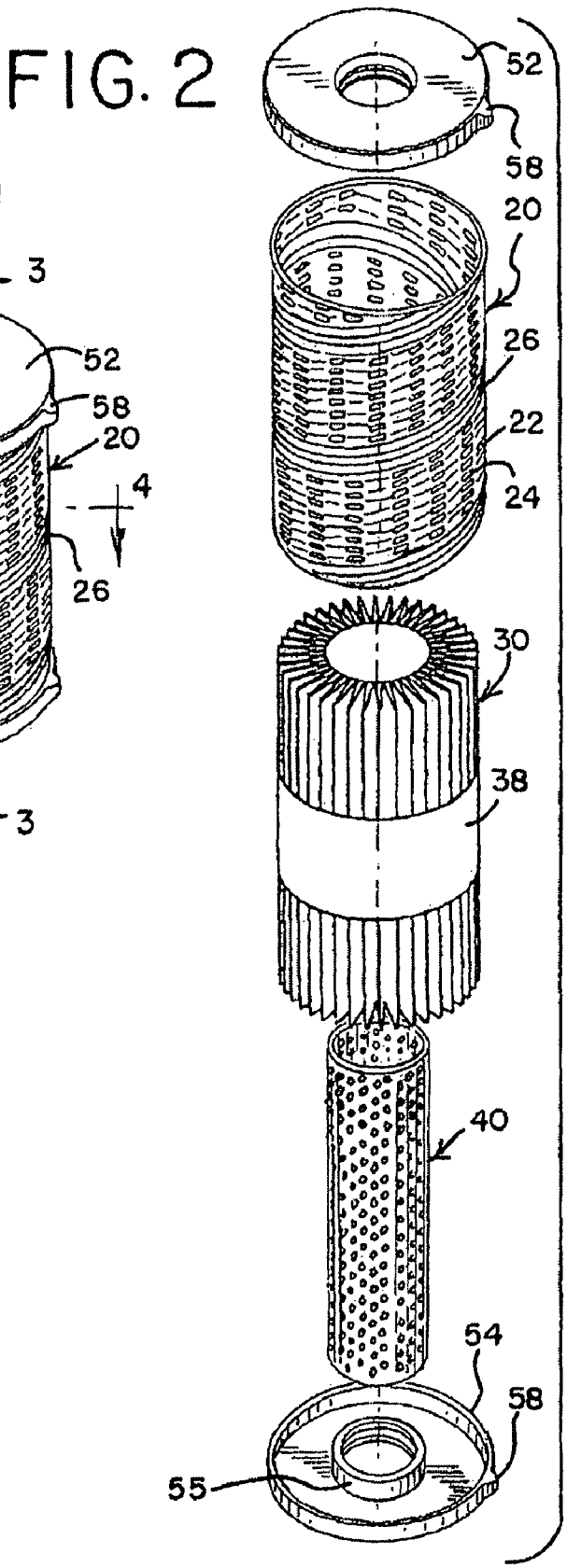

FIG. 7
FIG. 8
FIG. 9
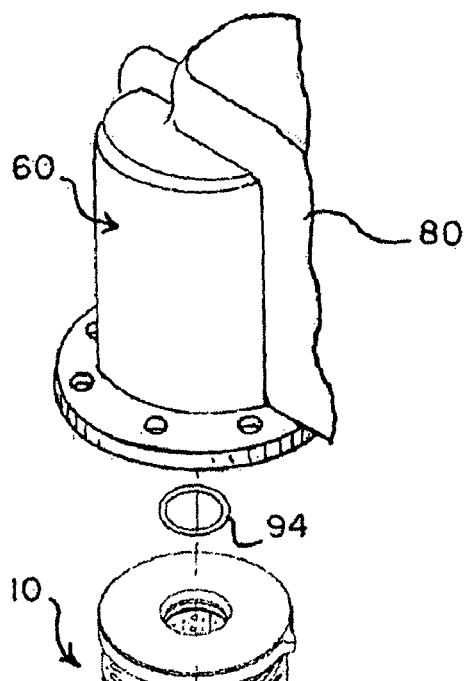
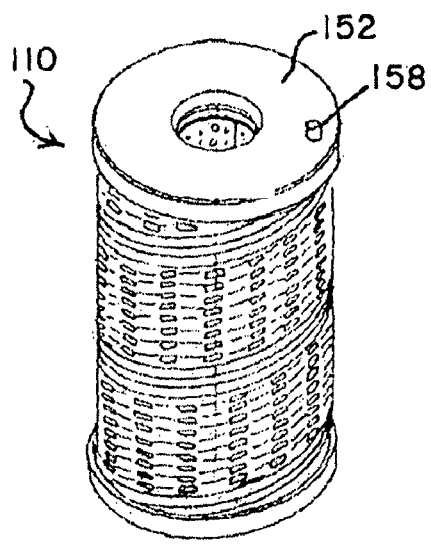
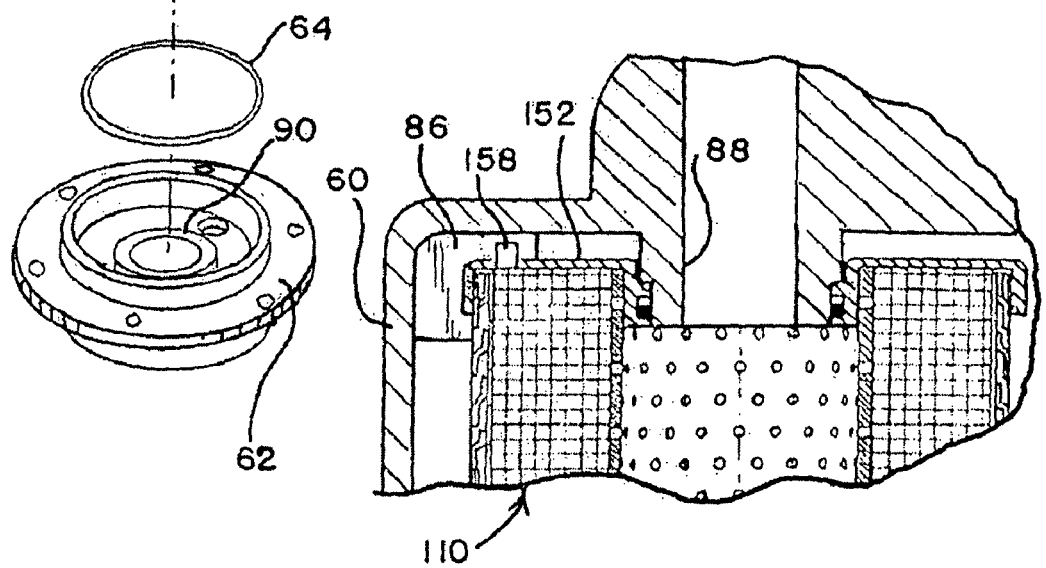

FILTER CARTRIDGE WITH INLET FLOW DIFFUSER

CROSS REFERENCE TO RELATED APPLICATION

The present application claims the benefit under 35 U.S.C. §119(e) of Provisional U.S. Patent Application Ser. No. 60/863,101, filed Oct. 26, 2006, which is hereby incorporated by reference in its entirety.

BACKGROUND

The present application relates to fluid filters, and particularly to fluid filters that are subjected to impinging fluid flow on the filter medium. The invention is broadly applicable and can be used in hydraulic, fuel and air filter applications.

Fluid filters are commonly used to prevent contaminants, especially particles, in the fluid from passing through the filter to downstream components. Fluid filters have many different constructions, but often include a support material in addition to the actual filter media. In addition, the filter media is usually part of a filter cartridge. The cartridge either acts as, or is designed to fit within, a chamber. The chamber and filter media are configured such that fluid entering the chamber must pass through the filter media before it exits the chamber.

In one application, fluid enters the chamber from a pump which increases the fluid's pressure for downstream applications. The filter cartridge is generally cylindrical. After leaving the pump, fluid flows into the filter chamber and enters from the outside of the filter, through the media, into a central chamber, which is connected to the outlet of the chamber. It was discovered that the cartridge was failing during use, and the area of failure was the end caps of the cartridge that connected to the filter chamber. It was believed that the fluid from the pump was impinging on the filter cartridge in a tangential manner, causing the cartridge to spin on its mountings. The spinning action caused wear on the fittings on the end caps of the filter, causing them to fail. Thus the fittings were strengthened, and it was decided to add features to the cartridge that would prevent it from spinning inside the chamber.

This fix prevented the fittings on the end caps from wearing and failing. However, it was later discovered that the filter media was failing, thereby allowing contaminants to pass-through the filter. Since the filter media had not been altered when the cartridge was changed to add the anti-rotation feature, it was unclear why the filter media was found to be failing. Several different approaches were considered to solve the problem, including using stainless steel wire to help support the filter media, and an outer guard tube with many holes through it. Also, changes were considered for the filtration media and pleat design. However, these initial approaches did not seem to solve the problem. Thus, there is a need for a filter cartridge that can be used in the chamber that will adequately filter the fluid without the media failing. Also, the cost and weight of the cartridge need to be kept at a minimum.

BRIEF SUMMARY OF THE INVENTION

The present inventors discovered that the cause of the filter media failing was due to the fact that the filter cartridge was positioned in the chamber such that the fluid flow from the pump was impinging directly on the filter media. When the filter cartridge was free to rotate, the force from this impinging flow was dissipated by the rotation of the cartridge in the chamber. However, when the rotation was prevented, the impinging flow rate and force were so great that they caused the filter media and its supporting material to be disrupted.

A filter cartridge has been invented which overcomes the problem. The filter cartridge is constructed with a guard that has multiple inlets into the cartridge, maintaining sufficient open area for the fluid to pass through, but the openings are shaped to prevent the fluid from impinging directly on the filter media.

In a first aspect, the invention is a filter cartridge comprising filter media and a housing surrounding the media. The housing has an outlet and is sealed such that all fluid flow out of the outlet must first enter the cartridge and pass through the media. The housing has multiple inlet flow paths configured so that fluid impinging on the housing is diffused as it enters the cartridge and is prevented from flowing directly towards the filter media.

In a second aspect, the invention is a combination of a filter cartridge and a chamber containing the filter cartridge, the chamber having an inlet and an outlet and being sized to house the cartridge. The inlet and cartridge are positioned with respect to each other such that flow through the inlet into the chamber directly impinges on the cartridge. The cartridge comprises filter media and a housing surrounding the media. The housing has an outlet connected to the chamber outlet and is sealed such that all fluid flow out of the chamber must first enter the cartridge and pass through the media. The housing has multiple inlet flow paths configured so that fluid impinging on the housing is diffused as it enters the cartridge and is prevented from impinging directly on the filter media.

A third aspect of the invention is a method of filtering fluid comprising forcing fluid through an inlet into a chamber containing a filter cartridge, the fluid flowing through the inlet and impinging directly on the filter cartridge; passing the fluid into the cartridge through multiple inlet flow paths configured so that fluid impinging on the housing is diffused as it enters the cartridge; filtering the fluid through filter media inside the cartridge; and passing filtered fluid out of the cartridge through a cartridge outlet in fluid communication with a chamber outlet.

With one embodiment, the filter media is a pleated structure inside of a tubular guard made of material that has louvered openings. This guard redirects the flow so that it has to follow a tortuous path to enter the filter cartridge, thus preventing direct impingement of the fluid on the filter media. While the filter cartridge of the present invention was developed to be placed within a chamber where there is direct impingement of fluid flow on the filtration media, the invention is also applicable to filters that are incorporated into manifolds, where direct impingement of the filtered fluid on the media could cause failure of the media.

These and other advantages of the invention, as well as the invention itself, will be more easily understood in view of the attached drawings.

DESCRIPTION OF THE DRAWINGS

FIG. 1 is a perspective view of a first embodiment of a filter cartridge of the present invention.

FIG. 2 is an exploded view of the filter cartridge of FIG. 1.

FIG. 7 is an exploded view of chamber of FIG. 5, showing the elements that are used to hold the filter cartridge inside the chamber.

FIG. 8 is perspective view of a second embodiment of a filter cartridge of the present invention.

FIG. 9 is a partial cross sectional view like FIG. 6 but with the filter cartridge of FIG. 8 in the chamber.

DETAILED DESCRIPTION OF THE DRAWINGS AND THE PRESENTLY PREFERRED EMBODIMENTS

Figure 3:
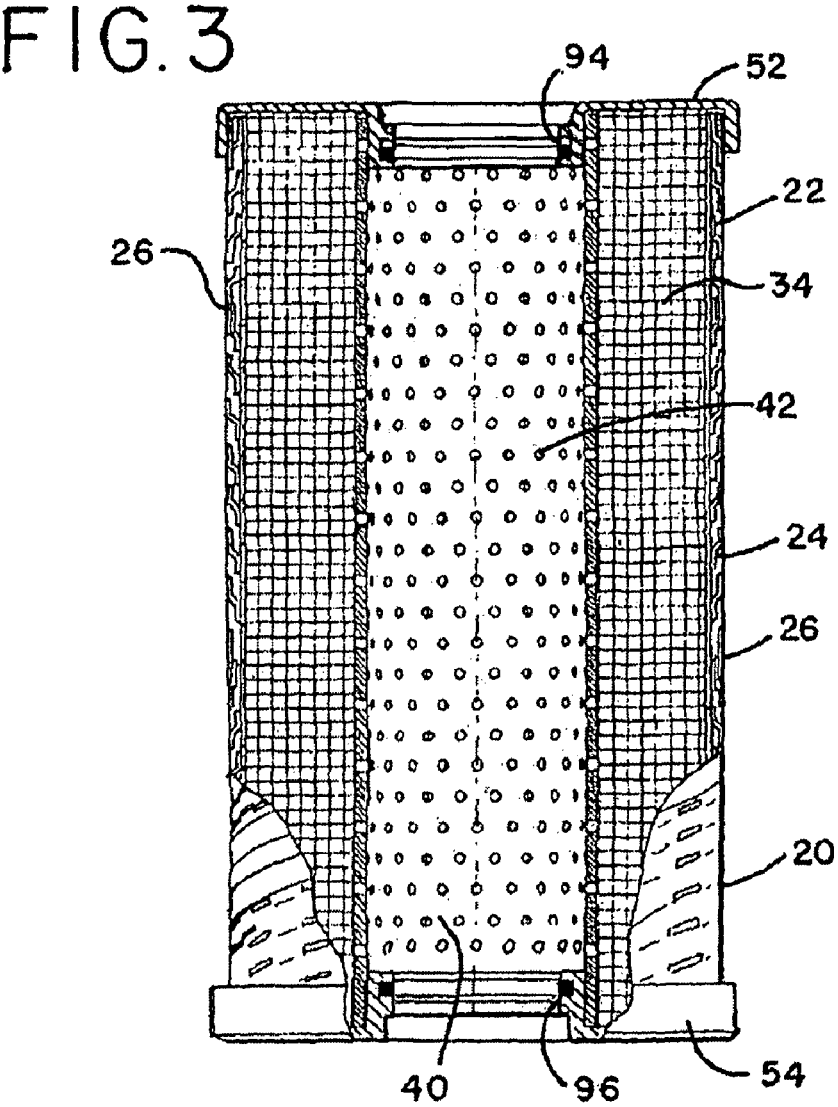
FIG. 3 is a cross-sectional view taken along line 3-3 of FIG. 1.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The preferred filter cartridge 10 of FIG. 1 will be described in conjunction with its use on a jet engine fuel pump assembly. However, as noted above, the invention is applicable to other fluids besides jet fuel, and to other applications.

The filter cartridge 10 has five main components: a center support tube 40, pleated filter media 30, a housing surrounding the media formed from a generally tubular diffuser member 20, and two end caps 52 and 54. As shown in FIG. 2, the preferred cartridge also includes a band 38 of fluid permeable material around the central section of the filter media, holding the filter media from contacting the tubular diffuser member.

Figure 4:
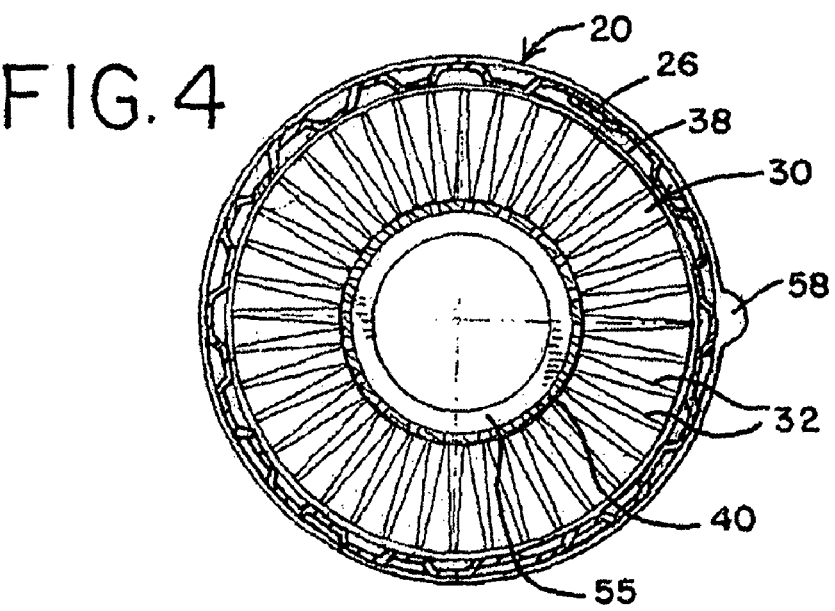
FIG. 4 is a cross-sectional view taken along line 4-4 of FIG. 1.

The filter media 30 is preferably a multi-layer material. In the preferred embodiment, the media composition includes glass fibers and binder formed into a layer, and supported by a support layer of spun bond thermoplastic fibers. A metallic wire screen 34, best seen in FIG. 3, is placed on the outside of the media, which faces incoming fluid. As shown in FIG. 4, the media is folded with pleats 32 into a generally cylindrical body surrounding the center support tube 40, with the folds extending outwardly from the center support tube. The center support tube has flow openings 42 into a central portion of the tube, and an outlet formed in each end of the tube, connecting to outlets formed in the center of each of end caps 52 and 54, which thus form the outlets of the housing. When the cartridge is in use, one of these outlets will be active and one will be sealed, as discussed below. A seating guide 55 is provided on each end cap. The seating guide serves three functions. Its outside diameter is used to locate and seat the inside of center support tube 40. Its inside diameter include a groove to hold an O-ring. Its height cooperates with the outer lip on the end cap to provide a well to hold a sealing compound used to seal the pieces of the cartridge together.

The end caps 52 and 54 are sealed to the tubular diffuser member 20 such that all fluid flow out of the outlet must first enter the cartridge and pass through the media. The tubular diffuser member 20 has multiple inlet flow paths configured so that fluid impinging on the housing is diffused as it enters the cartridge and is prevented from flowing directly towards the filter media. In the preferred embodiment, the diffuser member 20 is made from a strip of stamped louvered material formed into a tube shape using a spiral winding technique. A seam 26 is used to hold the spiral sections in place.

As noted above, the outer tubular diffuser member 20 surrounds the pleated filter media 30 and provides non-direct flow openings from outside the cartridge to the filter media. The non-direct flow openings are provided by openings stamped in the material making up the diffuser member. The louvered openings comprise a plurality of stamped tabs 22 extending inwardly and toward end cap 52, and a plurality of stamped tabs 24 extending inwardly and toward end cap 54. As best seen in FIGS. 1 and 2, the louvers are arranged so as to form alternating columns of oppositely directed louvers. In the preferred cartridge, the non-direct flow openings in the diffuser member provide at least about 25% open area, and more preferably about 40% open area. The amount of open area should be sufficient that there is not a significant pressure drop across the diffuser member.

The fluid permeable band 38 around the central section of the pleated filter media holds the pleated material to a smaller diameter than the inner diameter of the tubular diffuser member, thereby assuring a gap between the extremities of the pleats of the filter media and the tubular diffuser member to further diffuse fluid flow. This also prevents the edges of the pleats from coming into contact with the tabs 22 and 24 which form the louvered openings. Because the filter cartridge 10 is subject to mechanical vibrations found in the application, such contact could cause the tabs to rub against the filter media, causing holes to develop in the media.

Figure 5:
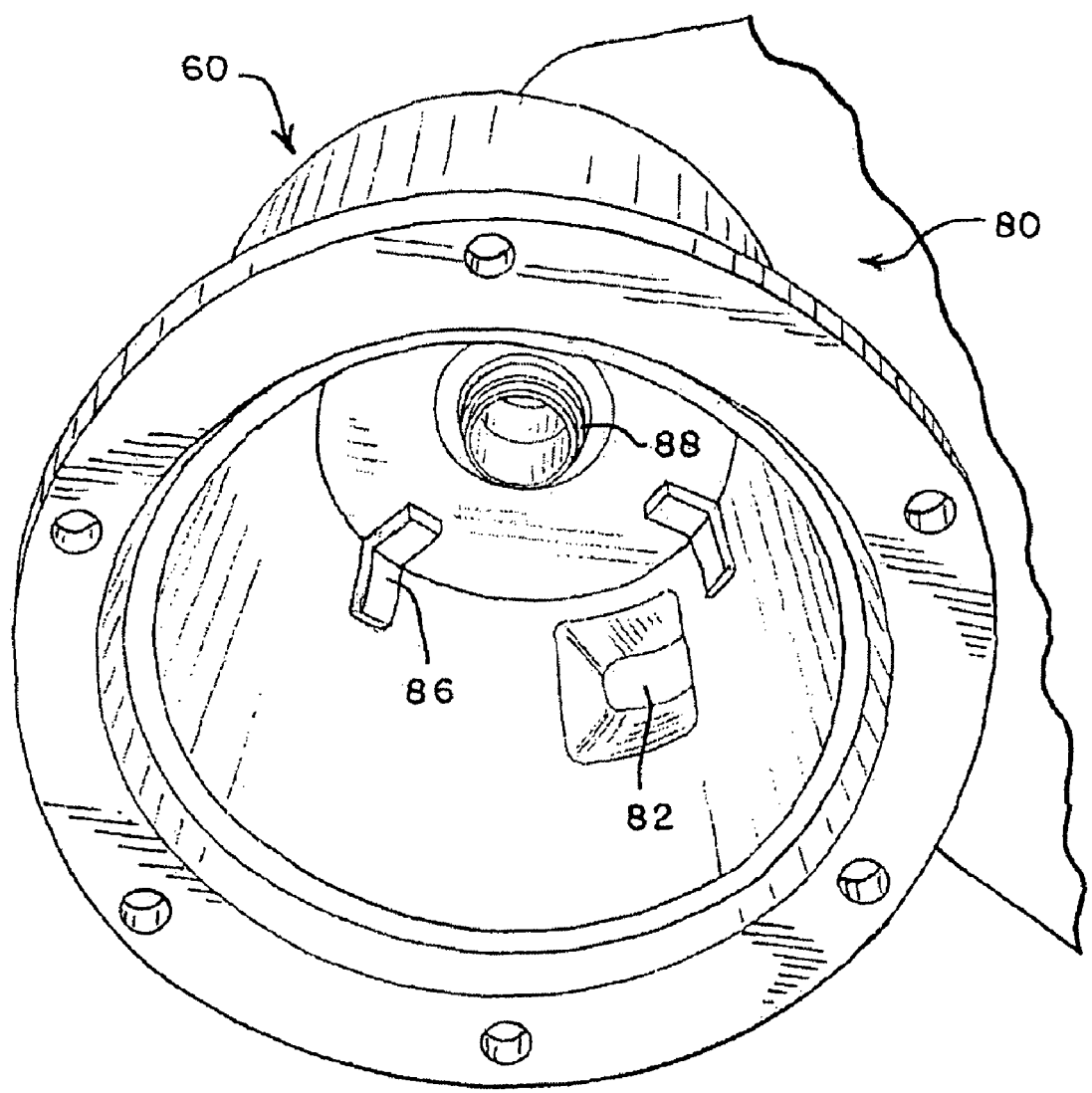
FIG. 5 is a perspective view of the inside of a chamber into which the filter cartridge of FIG. 1 may be placed.
Figure 6:
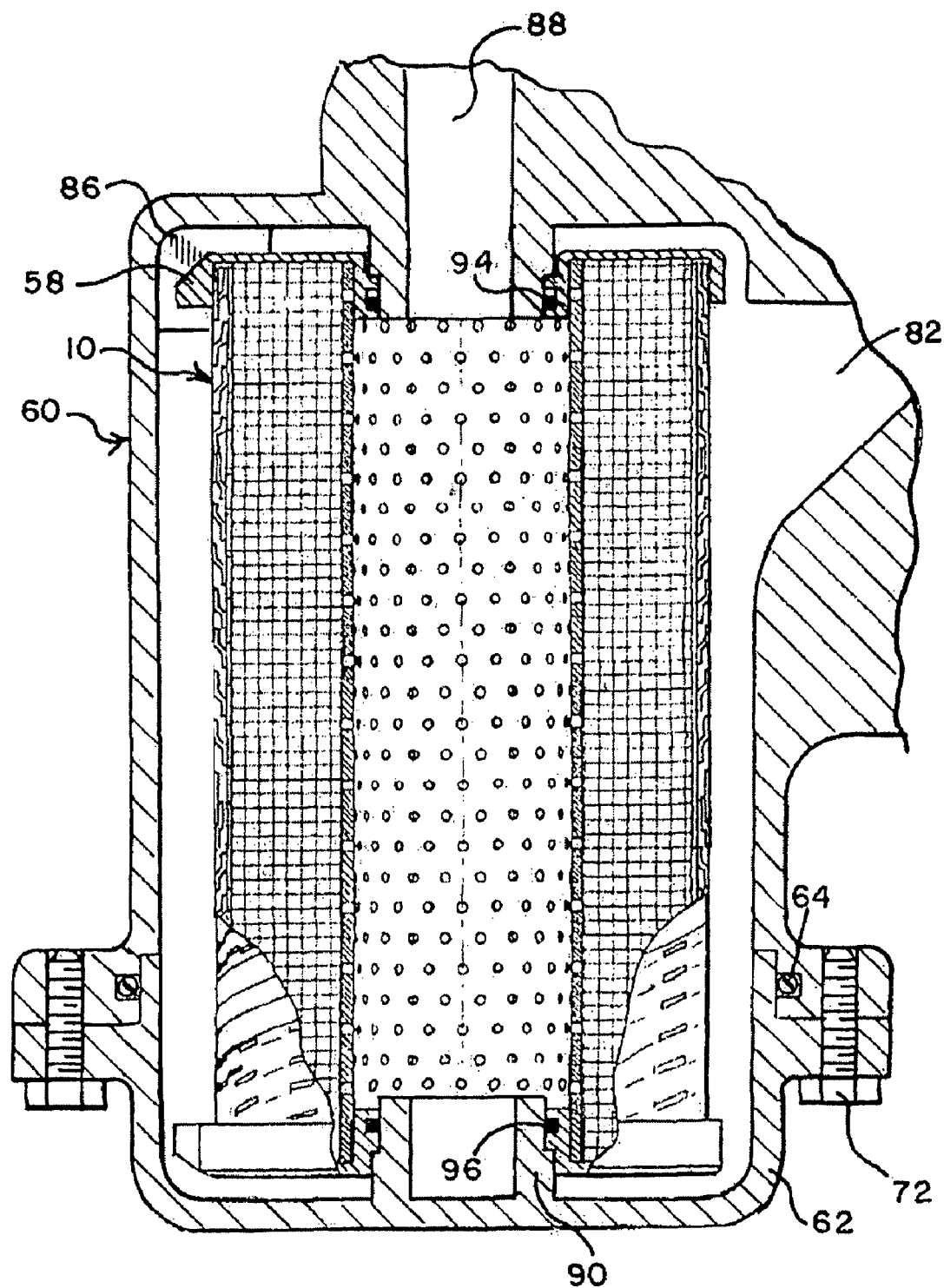
FIG. 6 is a cross-sectional view of the filter cartridge of FIG. 1 inside the chamber of FIG. 5.

FIG. 5 shows tile chamber 60 into which the cartridge 10 is placed during use. The chamber 60 is sized to house the cartridge 10, and has an inlet 82 and an outlet 88. As seen in FIG. 6, the inlet 82 and cartridge 10 are positioned with respect to each other such that flow through the inlet 82 into the chamber 60 directly impinges on the cartridge 10. The filter cartridge housing outlet is connected to the chamber outlet 88 and is sealed by an O-ring such that all fluid flow out of the chamber must first enter the cartridge and pass through the media The chamber includes a number of internal ribs 86. An extension element is formed on the end cap 52 and is configured to interfere with internal rib 86 to prevent the cartridge from spinning inside the chamber due to impingement of fluid on the cartridge from the chamber inlet by interference between the rib and the extension element. In the cartridge 10, the extension element comprises a radially extending tab 58. In an alternate embodiment, shown in FIGS. 8 and 9, the cartridge 10 has an axially extending pin 158 formed on end cap 152 that is configured to interfere with internal rib 86, as seen in FIG. 9. While only one end cap needs to have the extension member, as shown in FIG. 1, both end caps 52 and 54 can include tabs 58 so that the cartridge can be inserted into the chamber either end first.

The chamber 60 is sealed by a cap 62 and O-ring 64, best seen in FIGS. 6 and 7. O-rings 94 and 96 are used to seal the cartridge 10 inside the chamber 60 when the cap 62 is tightened down by bolts 72. Base 90 acts to seal the opening in end cap 54, thus closing off that outlet from the housing. Of course, the filter cartridge can be inserted so that the opening out of end cap 54 is connected to the chamber outlet 88, in which case base 90 would seal the outlet out of end cap 52.

During use, fluid is forced by the pump 80 through the inlet 82 into the chamber 60 containing the filter cartridge 10. The fluid flows through the inlet and impinges directly on the filter cartridge. The fluid passes into the cartridge through multiple inlet flow paths configured so that fluid impinging on the housing is diffused as it enters the cartridge. The fluid is filtered as it passes through filter media 30 inside the cartridge 10. The filtered fluid then passes out of the cartridge through the cartridge outlet, which is in fluid communication with a chamber outlet 88.

The preferred media pack assembly consists of four or more layers of porous material. The outer layer, a corrosion resistant steel (CRES) mesh, is for protection during handling. The second layer is the actual filter media that provides the filtration efficiency and retained dirt capacity. It consists of a resin impregnated in micro-fiberglass matrix. The third layer provides flow distribution and is used to support the media. All additional layers are to further support the media pack as needed. These layers are pleated, formed into a cylinder to maximize the filter area then side sealed with epoxy. The preferred diffuser member is louvered pattern with 0.030 inch louvered minimum openings. It has a flush, spiral lock seam. The material is made of aluminum sheet stock, which should be anodized for aviation fluid applications. It could also be made from passivated stainless steel sheet. The preferred permeable fluid band is a polymeric spunbond material. The preferred gap between the media pack outer diameter and the insider diameter of the diffuser member is at least 1/16 inch. The center support tube and end caps are preferably made from anodized aluminum, but could also be made from passivated stainless steel. The filter media and center support tube are sealed into the end caps, and the end caps are sealed to the diffuser member, using epoxy.

The preferred embodiment of the invention provides a filter cartridge that prevents direct impingement of the high velocity fluid on the filter media. The louvered openings, and the gap between the diffuser member and the pleats, helps to assure that the fluid does not hit directly onto the media. The earlier ideas that were tried and did not work had either a wire mesh, or small holes in a tubular guard, but these did not redirect the flow. To the extent that the small holes would have caused the flow to be slowed downs they would have to have been so small that they would have restricted the open area and had a significant pressure drop across the guard. The preferred diffuser redirects the flow without causing a significant increase in pressure drop.

It should be understood that various changes and modifications to the presently preferred embodiments described herein will be apparent to those skilled in the art. For example, instead of using a louvered material for the diffuser member, a protective outer tube with solid areas strategically placed in line with direct flow impingement, but perforations in other areas, could also be used. Such a protective outer tube would still provide multiple inlet flow paths configured so that fluid impinging on the housing is diffused as it enters the cartridge and is prevented from impinging directly on the filter media. Such changes and modifications can be made without departing from the spirit and scope of the present invention and without diminishing its intended advantages. It is therefore intended that such changes and modifications be covered by the appended claims.

The invention claimed is:

1. A method of filtering fluid comprising:
   a) forcing fluid through an inlet into a chamber containing a filter cartridge comprising filter media and a housing surrounding the media, the housing comprising a generally tubular diffuser member having two end caps, a length and an outlet, and being sealed such that all fluid flow out of the outlet must first enter the cartridge and pass through the media, the generally tubular diffuser member comprising louvered openings comprising a plurality of stamped tabs extending inwardly and towards a first end of the cartridge and a plurality of stamped tabs extending inwardly and toward a second end of the cartridge opposite the first end, the fluid flowing through the inlet and impinging directly on the filter cartridge;
   b) passing the fluid into the cartridge through multiple inlet flow paths configured so that fluid impinging on the cartridge is diffused as it enters the cartridge, said multiple inlet flow paths being provided by said louvers and being spaced along the length of the housing;
   c) filtering the fluid through the filter media inside the cartridge after the fluid has passed through said multiple inlet flow paths; and:
   d) passing filtered fluid out of the cartridge through a cartridge outlet in fluid communication with a chamber outlet.

2. The method of claim 1 wherein the fluid comprises jet fuel.

3. The method of claim 1 wherein the fluid is forced into the chamber by a fuel pump.

4. The method of claim 1 wherein the diffuser member comprises a strip of stamped louvered material formed into a tube shape.

5. The method of claim 1 wherein the filter media comprises a pleated, multi-layer material.

6. The method of claim 1 further comprising a band of fluid permeable material around the central section of the filter media holding the filter media from contacting the tubular diffuser member.

7. The method of claim 1 wherein at least one of the end caps comprises an extension element configured to interfere with internal structure of the chamber to prevent the cartridge from spinning inside the chamber.

8. The method of claim 1 wherein the filter media comprises a composition including glass fibers and binder formed into a layer and supported by a support layer of spun bond thermoplastic fibers and metallic wire screen.

9. The method of claim 1 wherein the cartridge comprises:
   a) a center support tube having flow openings into a central portion thereof and an outlet there from;
   b) the filter media comprising pleated filter media arranged in folds extending outwardly from the center support tube;
   c) the housing; and
   d) the end caps sealing the cartridge such that all flow into the cartridge is through the louvered openings in the diffuser member.

10. The method of claim 9 wherein the cartridge further comprises a fluid permeable band around a central section of the pleated filter media, holding the pleated material to a smaller diameter than the inner diameter of the tubular diffuser member, thereby assuring a gap between the extremities of the pleats of the filter media and the tubular diffuser member to further diffuse fluid flow.

11. The method of claim 9 wherein the louvered openings are provided by openings stamped in the material making up the diffuser member.

12. The method of claim 11 wherein the louvers comprise alternating columns of oppositely directed louvers.

13. The method of claim 9 wherein the louvered openings in the diffuser member provide at least about 25% open area.

14. The method of claim 1 wherein the multiple inlet flow paths are spaced along the entire length of the housing.

15. The method of claim 14 wherein the chamber includes at least one internal rib and the cartridge contains at least one extension element, the extension element and rib being configured such that the cartridge is prevented from spinning inside the chamber due to impingement of fluid on the cartridge from the chamber inlet by interference between the rib and the extension element.

16. The method of claim 14 wherein the extension element comprises a radially extending tab.

17. The method of claim 14 wherein the extension element comprises an axially extending pin.

18. A filter cartridge comprising:

a) filter media and b) a housing surrounding the media, the housing comprising a generally tubular diffuser member having two end caps, a length and an outlet, and being sealed such that all fluid flow out of the outlet must first enter the cartridge and pass through the media, the generally tubular diffuser member comprising louvered openings comprising a plurality of stamped tabs extending inwardly and towards a first end of the cartridge and a plurality of stamped tabs extending inwardly and toward a second end of the cartridge opposite the first end, the louvered opening providing multiple inlet flow paths configured so that fluid impinging on the cartridge is diffused as it enters the cartridge, said multiple inlet flow paths being spaced along the length of the housing.

19. The filter cartridge of claim 18 wherein the diffuser member comprises a strip of stamped louvered material formed into a tube shape.

20. The filter cartridge of claim 18 wherein the filter media comprises a pleated, multi-layer material.

21. The filter cartridge of claim 18 further comprising a band of fluid permeable material around the central section of the filter media holding the filter media from contacting the tubular diffuser member.

22. The filter cartridge of claim 18 wherein the filter media comprises a composition including glass fibers and binder formed into a layer and supported by a support layer of spun bond thermoplastic fibers and metallic wire screen.

23. The filter cartridge of claim 18 further comprising a center support tube having flow openings into a central portion thereof and an outlet there from and pleated filter media arranged in folds extending outwardly from the center support tube.

24. The filter cartridge of claim 18 wherein the louvers comprise alternating columns of oppositely directed louvers.

25. A combination of the filter cartridge of claim 18 and a chamber containing the filter cartridge, the chamber having an inlet and an outlet and being sized to house the cartridge, the inlet and cartridge being positioned with respect to each other such that flow through the inlet into the chamber directly impinges on the cartridge.

* * * * *